United States Patent Office 3,546,005
Patented Dec. 8, 1970

3,546,005

ORIENTED $CrO_2$ FILMS AND METHOD OF PRODUCING SAME

Robert C. de Vries, Burnt Hills, N.Y., assignor to General Electric Company, a corporation of New York No Drawing. Filed June 20, 1966, Ser. No. 558,573
Int. Cl. H01f *10/02, 10/04*
U.S. Cl. 117—106 4 Claims

ABSTRACT OF THE DISCLOSURE

Plate-like bodies of $CrO_2$ of uniquely large areas and of predetermined desired crystallographic orientation are made by a method which involves polishing part of a substrate crystal of a desired crystallographic plane and then epitaxially growing $CrO_2$ on the prepared surface until a $CrO_2$ deposit covers this surface to a thickness up to five microns.

This invention is concerned with plate-like films of $CrO_2$ and particularly is concerned with such films having a controlled crystallographic orientation and to a process for producing such films.

The expansion of technology in the electrical and electronic areas in recent years has resulted in increasingly sophisticated equipment designs and component geometries and in the creating and application of new materials delivering both significantly improved and unique properties. The demands placed upon magnetic materials, for example, have required materials of greater performance characteristics, improved reliability, and in many instances directional properties. Magnetic anisotropy is particularly important in applications such as storage elements for computers.

It is a principal object of this invention to provide plate-like films of a ferromagnetic metal oxide ($CrO_2$) which have controlled crystallographic orientations imparting magnetic anisotropy to the film.

Another object of this invention is to provide plate-like single crystal films of chromic oxide ($CrO_2$) having a controlled crystallographic orientation imparting magnetic anisotropy to the films.

A further object of this invention is to provide a process for producing plate-like films of ferromagnetic $CrO_2$ which have controlled crystallographic orientations imparting magnetic anisotropy to the films.

Other objects and advantages of this invention will be in part obvious and in part explained by reference to the accompanying specification.

Broadly, this invention deals with ferromagnetic metal oxide films and particularly to ferromagnetic films of chromic oxide ($CrO_2$) which have been deposited upon a substrate having a crystallographic structure compatible with that of the $CrO_2$ to thereby impart a controlled crystallographic orientation to the oxide film. It is possible for the plate-like film to have areas of more than one orientation by suitably preparing a substrate having preselected, different orientations.

The process comprises enclosing a suitable substrate material having a surface with a crystallographic orientation compatible with that of $CrO_2$ within a closed pressure vessel. A quantity of $CrO_3$ is also placed within the closed vessel and then heated to a temperature sufficient to cause the $CrO_3$ to dissociate and give up free oxygen. The resulting film of $CrO_2$ is then formed on the surface of the substrate body by a nucleation and growth process. It is important to the effective accomplishment of the process that the surface upon which the $CrO_2$ film is deposited be smooth and free of irregularities that would result in random rather than controlled grain growth.

Considering the invention in more detail, the process aspect will be discussed first. While chromic oxide ($CrO_2$) has been known in fine-grained form it has not, prior to this invention ever been produced or existed in comparatively large plate-like form. The basic process parameters that must be considered to effectively carry out the present process are:

(1) The particular orientation desired in the $CrO_2$ film to be porduced;

(2) The type and orientation of substrate required to result in epitaxial growth of the film orientation sought;

(3) The temperature and pressure at which dissociation of $CrO_3$ and growth of the $CrO_2$ film are effected; and (4) The smoothness of the substrate surface upon which the film is to be grown.

Considering the first of the process considerations, $CrO_2$ is ferromagnetic and will display magnetic anisotropy in the various crystallographic directions. The crystallographic structure of $CrO_2$ is that of rutile so that, for example, oriented layers can be grown epitaxially on the (100), (110), (210), and (001) crystallographic planes of single crystal $TiO_2$. Just which particular orientation is chosen is entirely a matter of choice depending upon the magnetic characteristics for which the user ultimately intends to use the film of $CrO_2$.

Next, it has been found that before an epitaxial and therefore crystallographically oriented film can be produced, the surface of the substrate upon which the film is to be deposited must be one having a crystallographic structure compatible with the crystallographic structure of $CrO_2$. It is, of course, apparent that since $CrO_2$ has the rutile structure, boules of rutile in single crystal form can be used to grow oriented films of $CrO_2$. In this instance, the lattices are isostructural so that epitaxial growth of $CrO_2$ being deposited can be effected quite easily. A similar condition is present with $MnO_2$ which is isostructural with $CrO_2$ and therefore constitutes an excellent growth substrate. It is not, however, necessary that the material is isostructural but merely that the crystallographic structure be compatible. Thus, substrate bodies composed of $Fe_2O_3$ (hematite), $\alpha Al_2O_3$ (sapphire), $Ch_2O_3$ and $Ti_2O_3$ are examples of other materials which can be suitably prepared to have a plane upon which epitaxial growth of an oriented film of $CrO_2$ can be effected. It is obvious that in all of these cases there can be no tendency toward the formation of chromates or other chemical reaction with the material being deposited, that is, the substrate must be substantially inert if an oriented film is to be developed. Thus, materials such as MgO, $BaTiO_3$ or mica would not be suitable as substrate materials since they tend toward chromate formation. Similarly, any material containing an alkali metal or alkaline earth ion, divalent transition metal ions such as $Ni^{2+}$, $Fe^{2+}$, $Cd^{2+}$, $Pb^{2+}$ and other univalent ions such as $Ag^{+}$, $Cu^{+}$ would not be good substrates for $CrO_2$.

It was mentioned earlier that the reactants are placed within a closed pressure vessel and the $CrO_3$ heated to a point where dissociation occurs. The final dissociation reaction is:

$$CrO_3+\Delta H\rightarrow CrO_2+\tfrac{1}{2}O_2$$

When the $CrO_3$ is heated in the pressure vessel initially at atmospheric pressure, decomposition of this compound occurs with the formation of other chromium oxides such as $Cr_3O_8$ and $Cr_2O_5$ and free oxygen. The pressure within the vessel increases as greater amounts of oxygen are formed as decomposition proceeds until at a temperature of about 375° C. and above the pressure-temperature stability region of $CrO_2$ is reached.

Generally, formation of the $CrO_2$ film can be effected within the temperature range of from about 375° C. to 550° C., depending on the pressure. More specific information on the pressure-temperature stability of $CrO_2$ can be found by reference to B. Kubota, J. Am. Cer. Soc., 44 (5) 239 (1961) and R. Roy, Colloque International du CNRS., Soc. Chim., 5th Series, 1965, p. 1067. During the heating and dissociation of the $CrO_3$ the selected substrate can either be immersed in the $CrO_3$ (which is liquid during the early stages of the deposition process) or the substrate can be suitably supported within the closed pressure vessel and subjected to the vapors emanating from the molten $CrO_3$. The latter method is generally preferred since growth of the $CrO_2$ film by the immersion method normally results in the formation of a non-oriented $CrO_2$ matrix overlay which must then be removed to expose the oriented plate-like film located adjacent the substrate surface.

Since $CrO_3$ is a highly hygroscopic material, care should be taken to insure that the acquired water content does not become excessive or the oriented growth obtained is covered with a tenacious random layer which makes the oriented layer essentially inaccessible. It has been found that if the mole ratio of $CrO_3$ to $H_2O$ is less than about 10 to 7, inferior results occur. It is much to be preferred that the $CrO_3$ to $H_2O$ ratio be on the order of 10 to 5 or greater. Minimum water content unequivocally delivers the best $CrO_2$ films.

If $CrO_2$ films having a controlled crystallographic orientation are to be produced, then the substrate surface upon which deposition and growth is effected must be polished. If removal of most of the surface flaws is not effected, then the resulting film will assume an essentially non-oriented condition and no anistropy of magnetic properties can be obtained. It has been found that polishing of the substrate surface to remove surface scratches or other related defects can be accomplished by procedures, normally used in the ceramic and metallographic polishing practices. It is apparent that depending upon the particular substrate used, that is, its hardness, primarily different types of polishing agents will be used to render a smooth and defect-free surface. A final polish with polishing agents such as $0.3\mu$ $Al_2O_3$ will normally render the required degree of smoothness.

As examples, oriented layers of $CrO_2$ were grown epitaxially on the (100), (110), (210), and (001) surfaces of single crystal $TiO_2$ (rutile) and on the (0001) planes of single crystal $Al_2O_3$ and $Fe_2O_3$ (hematite) by the decomposition of $CrO_3$ in a pressure vessel. The surfaces of all specimens were polished down through $0.3\mu$ $Al_2O_3$ powder to be substantially free of scratches or other surface defects. Further, oriented films of $CrO_2$ were grown on large grains of platinum in polycrystalline platinum sheet and on $CrO_2$ itself. In all of these cases the procedure followed was to enclose the chosen substrate within a closed pressure vessel with a quantity of $CrO_3$ and then heat the $CrO_3$ within the stability range of $CrO_2$, which is approximately 375° C. to 550° C. within a wide pressure range. In a twenty milliliter Morey-type pressure vessel the $CrO_2$ was held in a Pyrex test tube and in an amount sufficient to develop about 4,000 p.s.i. oxygen pressure at 425° C. This temperature was used in most of the film production and is about the middle of $CrO_2$ stability range at the above pressure.

Heating rates for the decomposition process were varied from 40° C. to 130° C. per hour with the time at 425° C. being varied from one to two to 48 hours. Whereas a time period of about one to two hours in the $CrO_2$ region represents a practical lower limit necessary to insure development of a useful film (primarily to insure total decomposition of $Cr_2O_5$, the upper time limit is not important as long as sufficient oxygen pressure is maintained to stay within $CrO_2$ stability region. The films produced generally had a thickness approximating about two microns although films of about five microns thickness by 10 millimeters square were produced on the (100) and (001) faces of rutile and at intermediate orientations about the "C" axis of $CrO_2$.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An article of manufacture comprising a supporting substrate body including a crystal surface selected from the group consisting of $TiO_2$ (rutile), $MnO_2$, $Fe_2O_3$ (hematite), alpha $Al_2O_3$ (sapphire), $Cr_2O_3$ and $Ti_2O_3$, and a plate-like film of $CrO_2$ epitaxially bonded to the single crystal surface of said substrate body, said film being of thickness less than about five microns and of crystallographic orientation selected from the group consisting of (100), (110), (210) and (001).

2. An article of manufacture as defined in claim 1 wherein the crystal surface of said substrate body is a material selected from the group consisting of $TiO_2$ (rutile form), $MnO_2$, $Fe_2O_3$ (hematite), alpha $Al_2O_3$ (sapphire), $Cr_2O_3$ and $Ti_2O_3$, and wherein the $CrO_2$ film is from two to five microns thick and has an exposed surface area of about 10 square millimeters.

3. A process for producing plate-like bodies of $CrO_2$ having controlled crystallographic orientation comprising, providing a substrate body of a material substantially chemically inert with respect to the oxides of chromium selected from the group consisting of $TiO_2$ (rutile), $MnO_2$, $Fe_2O_3$ (hematite), alpha $Al_2O_3$ (sapphire), $Cr_2O_3$ and $Ti_2O_3$, said substrate body including a polished crystal surface and further having a (100), (110), (210) or (001) crystallographic plane, placing the substrate body together with a quantity of $CrO_3$ within a closed pressure vessel, heating the $CrO_3$ to a temperature sufficient to cause dissociation thereof according to the formula $$CrO_3+\Delta H \rightarrow CrO_2+\tfrac{1}{2}O_2$$

and continuing the heating for a time sufficient to grow a plate-like body of $CrO_2$ on the said crystallographic plane of the polished surface of the substrate body, the plate-like body of $CrO_2$ being epitaxial with the substrate and possessing the crystallographic orientation of the said crystallographic plane and being of thickness less than about five microns.

4. The process as defined in claim 3 wherein water present in the $CrO_3$ is in amount such that the mole ratio of $CrO_3$ to $H_2O$ is no less than about 10 to 7.

References Cited

UNITED STATES PATENTS

| | | | |
|---|---|---|---|
| 2,571,700 | 10/1957 | Ford | 117—106D |
| 2,923,684 | 2/1960 | Ingraham | 117—235X |
| 2,956,955 | 10/1960 | Arthur | 23—145X |
| 3,074,778 | 1/1963 | Cox | 252—62.51X |
| 3,243,260 | 3/1966 | Kubota et al. | 252—62.51X |
| 3,371,043 | 2/1968 | Hund et al. | 252—62.51 |

ALFRED L. LEAVITT, Primary Examiner

J. R. BATTEN, Jr., Assistant Examiner

U.S. Cl. X.R.

117—113, 169, 235